(12) United States Patent
Bauer et al.

(10) Patent No.: US 10,960,795 B2
(45) Date of Patent: Mar. 30, 2021

(54) AIR DISTRIBUTION CHAMBER FOR A VEHICLE SEAT

(71) Applicant: I.G. BAUERHIN GMBH, Gruendau (DE)

(72) Inventors: Stefan Bauer, Alzenau (DE); Felix Henss, Floersbachtal (DE); Saskia Bialek, Waechtersbach (DE); Thorsten Schleucher, Hasselroth (DE); Jochen Michelmann, Gelnhausen (DE)

(73) Assignee: I.G. BAUERHIN GmbH, Gruendau (DE)

( * ) Notice: Subject to any disclaimer, the term of this patent is extended or adjusted under 35 U.S.C. 154(b) by 453 days.

(21) Appl. No.: 15/453,007

(22) Filed: Mar. 8, 2017

(65) Prior Publication Data

US 2017/0282764 A1    Oct. 5, 2017

(30) Foreign Application Priority Data

Apr. 4, 2016    (DE) ..................... 20 2016 002 041.3

(51) Int. Cl.
*B60N 2/56*    (2006.01)
(52) U.S. Cl.
CPC ......... *B60N 2/5635* (2013.01); *B60N 2/5642* (2013.01)
(58) Field of Classification Search
CPC .. B60N 2/5635; B60N 2/5621; B60N 2/5642; B60N 2/5657; B60N 2/565; B60H 1/00285
See application file for complete search history.

(56) References Cited

U.S. PATENT DOCUMENTS

| 5,692,952 A * | 12/1997 | Chih-Hung | B60H 1/00285 |
| | | | 297/180.11 |
| 2006/0175877 A1* | 8/2006 | Alionte | A47C 7/74 |
| | | | 297/180.14 |
| 2007/0188007 A1* | 8/2007 | Lazanja | B60N 2/5635 |
| | | | 297/452.42 |
| 2007/0277313 A1 | 12/2007 | Terech | |
| 2012/0315132 A1* | 12/2012 | Axakov | B60N 2/5635 |
| | | | 415/182.1 |
| 2015/0079892 A1* | 3/2015 | Bauer | B60N 2/5642 |
| | | | 454/120 |

FOREIGN PATENT DOCUMENTS

EP        2826663 A1    1/2015

* cited by examiner

*Primary Examiner* — Steven B McAllister
*Assistant Examiner* — Elizabeth M. May
(74) *Attorney, Agent, or Firm* — Robert W. Morris; Eckert Seamans Cherin & Mellott, LLC (57) ABSTRACT

An air conditioning device for a vehicle seat, comprising at least one air distribution module (1) having at least one air distribution chamber which is open on the top side (4) opposite the carrier layer (6), and wherein the carrier layer (6) has at least one extension section (12) which projects beyond the part of the carrier layer that is not covered by the bottom side of the insert and can be used for mounting a fan, a fan housing or a fan bracket on the air distribution module (1), by at least surface parts of the extension section (12) surrounding at least partially the fan and/or a fan housing and/or the fan bracket. The extension section (12), or a respective tab (13) as part of the extension section (12), is provided with at least one adhesive layer (18) on its top and/or bottom side.

4 Claims, 8 Drawing Sheets

AIR DISTRIBUTION CHAMBER FOR A VEHICLE SEAT

BACKGROUND OF THE INVENTION

The present invention relates to an air conditioning device for a vehicle seat.

Such an air conditioning device includes at least one air distribution module having at least one air distribution chamber. The air distribution chamber is delimited at least at a part of its outer circumference by an insert having a top and a bottom side. The air distribution chamber is delimited by a carrier layer on that side that is correlated to the bottom side of the insert. The carrier layer is connected to the bottom side of the insert at least via a partial surface. An air supply opening is provided to supply air to the air distribution chamber.

EP 2 826 663 A1 describes an air-conditioning device for a vehicle seat that includes a spacer material, which forms at least a part of an air distribution chamber. The spacer material is covered on top by a top layer. An air-impermeable bottom layer is arranged on the bottom side of the spacer material opposite the top layer. The top layer and the bottom layer are connected around the outer circumference of the spacer material. Also provided are an air supply opening to the air distribution chamber and air outlet openings in the top layer for discharging air from the air distribution chamber. The top layer and the bottom layer are interconnected at least around the outer circumference via a frame-shaped insert.

US 2007/0277313 A1 describes an air-conditioned seat. This seat comprises a seat cushion through which a plurality of flow passages extends from the top side thereof to the bottom side thereof. A support element is arranged at the bottom side of the seat cushion. Air is distributed to the flow passages via a distribution chamber and guided to the seat surface. The support element is in direct contact with the bottom side of the seat cushion. The air distribution chamber is formed by a recess in the seat cushion.

SUMMARY OF THE INVENTION

The principal objective of the present invention is to create an air-conditioning device which has a simple design, avoids disadvantages found in the prior art and improves the flow behavior of the air-conditioning device.

This objective, as well as other objectives that will become apparent from the discussion that follows, are achieved, in accordance with the present invention, by providing an air-conditioning device which includes an air distribution module with at least one air distribution chamber. This air distribution chamber serves to distribute air, which is supplied by a fan or another device, across a larger area of the seat cushion, preferably on the bottom side of the seat cushion, usually referred to as the B-side. However, it is not excluded that such an air distribution chamber can also be arranged on the top side or both on the bottom side as well as on the top side.

The air distribution chamber is delimited at least at a part of its outer circumference by an insert that has a top side and a bottom side. A carrier layer is arranged at the bottom of the insert, thus delimiting the air distribution chamber on this bottom side. The carrier layer covers at least a partial surface of the insert and is connected to it, which means that it is adhesively bonded to the insert over the entire area or partially. In this case, adhesive bonding means that the carrier layer and the corresponding surface are connected at the bottom side of the insert in such a way that essentially no air can escape from the air distribution chamber in the region of this connection. Insofar, adhesive bonding also includes other equivalent bonding measures such as, for example, a connection via a hook and loop fastener, a connection by welding, and the like.

In order to supply air to the air distribution chamber from a fan, which is specifically provided for this purpose, at least one break is provided in the insert, and/or an opening is formed in the carrier layer, so that the air can be supplied alternatively or additionally to the air distribution chamber via the carrier layer. In one embodiment, not only the insert is interrupted, but also an opening is present in the carrier layer in the region of this break so that ultimately a fan or a corresponding air hose can be connected at the edge of this air distribution module such that air can be supplied simultaneously via the break in the insert and via the opening in the carrier layer. In this case, a fan can be connected to the air distribution module such that it supplies air axially or also radially into the air distribution chamber; correspondingly, either an axial fan or a radial fan or a diagonal fan is used. In one particular embodiment, an intermediate housing part is inserted into the air distribution chamber between the fan and the air inlet opening; one end of this intermediate housing part is thereby connected to the air distribution chamber, while the other end of this intermediate housing part is connected to a fan or fan housing.

The top side of the air distribution module, i.e. the side that is the located opposite the carrier layer, remains open. On this side, the air distribution chamber is covered by a portion of the cushion part against which the top side of the insert rests; the insert is preferably inserted with its top side into a preferably adapted recess in a cushion part.

A particular feature of the air conditioning device according to the invention is that no elements, which extend in the air distribution space from the carrier layer perpendicular to the plane that is defined (spanned) by the top side of the insert, are inserted into the air distribution chamber. As a result, there are no large flow resistances for the air supplied to the air distribution chamber. Only low turbulences arise if any at all and noise generation caused by the air flow in the air distribution chamber, should it occur, is extremely low. However, the statement that the air distribution chamber is free of any parts does not mean that the carrier layer cannot be covered by a surface element in the air distribution chamber. In particular, such a surface element can serve to stiffen the air distribution chamber such that it cannot collapse in a direction parallel to the carrier layer, so that it has a certain degree of dimensional stability. However, at least 80% of the air distribution chamber volume should be left free.

As already mentioned above, the air distribution chamber can be open on the top side opposite the carrier layer. However, this information implies that the air distribution chamber can be completely or partly covered by another part of the seat or cushion.

In a further embodiment, the air distribution chamber can be provided on the top side opposite the carrier layer with an essentially air-permeable and at least partially cover layer that is not part of the seat. This cover layer can be fastened to the seat or a seat cushion or backrest cushion using fastening means, for example, double-sided adhesive material or hook and loop fasteners.

It is essential that the carrier layer has at least one extension section for mounting a fan, a housing of a fan or a fan bracket on the air distribution module. Such an extension section is a part of the carrier layer that protrudes beyond the part of the carrier layer that is not covered by the bottom side of the insert. This extension section serves to hold and mount the fan, the housing of a fan and/or a fan bracket on the air distribution module. For this purpose, the extension section of the carrier layer is placed around the fan, around the housing of a fan, or the fan bracket, such that it can be fastened directly, at least in a substantial part of the circumference, to the air distribution module.

This measure has the advantage that no additional fastening parts are required, provided that the carrier layer present in any case is used for this purpose by being extended accordingly in the precut in areas which are assigned to the fan, the housing of a fan or a fan bracket.

The carrier layer and the extension section can be made in one piece, which means that the corresponding precut is one cohesive surface element. However, the specification in one piece does not exclude the fact that the carrier layer and the extension section are composed of two surface parts, although this is not necessary. However, it is possible to form the extension section of a material different from the material of the carrier layer, although it is preferred to use the same material for both parts.

The extension section can, for example, always be positioned at the carrier layer when the extension section, or also a plurality of extension sections, are formed from tabs or long, strip-shaped material webs that have a length such that they almost fully surround the fan, the housing of a fan or the fan bracket. For such a case, it is appropriate in view of a material consumption to attach the extension section or the extension sections to the carrier layer that is located at the bottom side of the insert.

The carrier layer is essentially impermeable to air such that the air supplied to the air distribution chamber is almost completely guided across the opposing, open side, i.e., the top side, of the insert to the surface of the seat to be ventilated. When the at least one extension section is attached to the carrier layer as described above, a material different from the material of the carrier layer could also be used for the extension section.

The carrier layer can be formed from a polyester material, preferably from a nonwoven-like polyester material, which is additionally fused on at least one side surface and/or compacted to be essentially impermeable to air. However, other measures are also conceivable to keep the air permeability of the carrier layer low, for example by impregnating the material of the carrier layer with a resin. The carrier layer can also be provided with an additional film which can be at least partly air-permeable or essentially air-impermeable, as required.

The extension section preferably has an approximately rectangular or trapezoidal contour with such dimensions that it almost entirely covers a fan for the purpose of being fastened to the air distribution module, but only so that the corresponding air suction opening of the fan is not substantially covered so as not to hinder the suction of air.

If only the fan for the air supply is mentioned in the description, this shall also include the housing of a fan or the fan bracket to the extent that the respective described embodiment or the respectively described feature permit this for design reasons.

It is intended that the extension section has at least one adhesive layer on its top side and/or bottom side, in particular in the edge area or end area of the extension section with which the extension section can be connected to the fan (fan housing) or to the top side of the insert or to the bottom side of the carrier layer, wherein the carrier layers are correspondingly folded over for this purpose.

A particular feature of the invention in one particular embodiment is that the carrier layer in the transition area to the extension section has a slot, which is positioned in the region of the break of the insert forming an air supply opening where the extension section of the carrier layer is positioned. In this region, the extension section is folded over to the top side of the insert and attached to the top side of the insert while at the same time enclosing the fan so that the fan is held by the extension section. In other words, the slot, which may also be referred to as a long hole, is located in the bend area of the extension section, where the extension section is preferably folded over from the plane resting on the bottom side of the insert to the top side of the insert.

The extension section can have at least one tab section on at least one free side which is not opposite the side where the extension portion is folded over to the top side of the insert. However, it is also provided that the extension section has at least one respective tab section on two opposite sides, which are each fastened at least with their free ends on the top side of the insert. In the latter case, the tabs form a T-shape in the precut with the extension section.

The extension section can also have at least one tab section on two opposite sides, as described above, each of which has a length such that it initially leads to the top side of the insert, resting on the latter, and from there back to the bottom side of the insert, and that at least their free ends are fastened on the bottom side of the insert to the carrier layer, preferably to the outer side thereof.

In order to attach the insert, for example, to a cushion part, but also to attach the extension section of the carrier layer to the insert, at least one adhesive layer is applied to the top side of the insert, which preferably covers a predominant part of the surface of this top side.

In the event that the extension section of the carrier layer has any tab associated therewith to secure it to the air distribution module, the surface sides of the tab which corresponds to the inner side of the carrier layer that faces the air distribution chamber are provided with at least one adhesive layer over a partial surface. Thus, the tabs can be connected directly to the insert or to the carrier layer, folded back to the latter. Instead of an adhesive layer, a hook and loop fastener or a nap fastener or one or more cable ties can also be used.

In the event that the extension section of the carrier layer has any tab associated therewith for fastening an air distribution module to it, for example, a fan, the tabs, which are formed at least partially opposite the extension section or at least partially mirrored around a center line of the extension section, are suitably folded or folded several times to guide them to the air distribution module. Such a folding technique, which can be applied with respect to the tabs, is known in paper folding technology under the name Origami. By means of this folding technique, the ends of the tabs can be folded into each other in such a way that no additional adhesive layers or the application of other closure types are required.

A further advantageous method of attachment is to weld the fan, the housing of a fan or the fan bracket by means of ultrasonic welding or hot-stamping or high-frequency welding or laser beam welding or circular welding or rotary friction welding or ultrasonic welding or vibration welding or hot gas welding to or with the carrier layer.

Particularly useful is an embodiment in which the fan, the housing of a fan or the fan bracket has an essentially dimensionally stable tongue, which rests essentially flat on the inner side of the part of the carrier layer delimiting the air distribution chamber. This tongue forms a stable extension, which is directly connected to the air supply device and is anchored in the air distribution module by the tongue resting against the carrier layer and/or being clamped between the carrier layers and the bottom side of the insert.

Particularly preferred, and to be regarded as an independent inventive idea, is a design of the air-conditioning module, in which a reinforcing element is inserted into the at least one air distribution chamber, which has at least one base plate that rests on the carrier layer at least over a partial surface. This insert forms a reinforcement of the at least one air distribution chamber so that it cannot collapse under load. This is to be understood as meaning that the insert prevents the air distribution chamber in the plane in which the reinforcing element extends, from essentially changing its dimensions and shape through the reinforcing element. However, such a reinforcing element is not required in all applications of the air-conditioning device or the air distribution module and it should be used in particular if the installation situation of the air-conditioning device into a seat results in a force effect on the air distribution chamber or corresponding forces are to be expected during use of the seat.

In one embodiment, the reinforcing element has, on two opposing sides, retaining parts which rest on and/or are supported by two opposing sides of the insert that delimit the air distribution chamber. As a result, forces that act on the reinforcing element via the insert or forces that are transmitted to the insert via the reinforcing element are distributed over a larger area of the side walls of the insert, which delimit the air distribution chamber. This effect can be further reinforced by the fact that the respective retaining parts are supported on the opposite sides of the insert and additionally rest on the top side of the insert, which means on the side of the insert that is opposite the carrier layer. Viewed in the cross-section, the retaining parts are L-shaped, starting from the edge of the carrier layer. However, other forms of these retaining parts are possible provided that they at least partly fulfill the above-stated objective.

The retaining parts described above are preferably integrally connected to the base plate of the reinforcing element, although they can also be positioned at the base plate.

A further, advantageous measure is that the retaining parts are each subdivided into a plurality of holding elements in the form of tongue-like parts along the base plate, so that they are continuously aligned with each other and are movable independently of one another. These holding elements are preferably separated only by a small gap, with a preferred gap width of 1 mm to 2 mm, and have a width which preferably lies between 5 mm and 10 mm. However, it is also provided that the adjacent holding elements are spaced apart in the range from 10 mm to 20 mm. Such holding elements, which are decoupled from one another, allow at least a small curvature or mobility of the base plate or of the reinforcing element so that the air distribution module can adapt to a slight movement and deformation of a seat cushion.

The reinforcing element can be extended on one side that is associated with the air supply opening and can be designed as a tubular channel for receiving and/or connecting a fan or the fan housing of a fan or the fan bracket so that a stable base for such a receiving and/or attachment is provided at the air distribution module. In such a case, the reinforcing element thus assumes a double function, namely the stiffening of the air distribution chamber and the possibility of attaching the fan directly or indirectly thereto.

The reinforcing element is formed from a rigid material with a defined bending elasticity, taking into account the above-described tasks which the reinforcing element is to take on, so that the contour dimensions of the air distribution chamber are not substantially changed under the acting forces but on the other hand a small curvature of the base plate is possible.

The thickness of the base plate of the reinforcing element is selected in the range of 1 mm to 3 mm, preferably in the range of 1 mm to 2 mm, so that this base plate does not substantially impair the cross-section of the air distribution chamber. The same thickness dimensions also apply to the retaining parts, irrespective of whether they are formed integrally with the base plate or are positioned at the base plate.

The reinforcing element is expediently made of a plastic with essentially elastic properties.

In comparison, the carrier layer is preferably constructed from a polyester material or from a prefabricated polyester material or an additional fiber-reinforced polyester material or a polyester bico material, preferably in fiber form. Other materials provided for the reinforcing element are materials made of a thermoplast or a thermoset or an elastomer. The polyester bico material is a material that can be solidified and shaped by means of heat and/or mechanical pressurization.

When the reinforcing element described above is used in the air distribution chamber, specific properties can be assigned to the carrier layer and the reinforcing element, which are associated on the one hand with delimiting the air distribution chamber on the bottom side of the insert and on the other hand with the stiffening the air distribution chamber. With respect to the reinforcing element, care should be taken that in the air distribution chamber between the carrier layer and the plane stretched by the top side of the insert, there extends essentially no stiffening or spacing parts, which can impede an air flow in the air distribution chamber. This means that the air distribution chamber remains almost completely free of such stiffening or spacing parts.

For some applications and installation situations of the air distribution module, respective air supply openings corresponding to one another are formed in the reinforcing element and in the carrier layer on the bottom side of the insert in order to supply air into the air distribution chamber, if applicable also to remove air via the same.

The thickness of the carrier layer is in the range from 0.5 mm, preferably from 1.0 mm to 3.0 mm, with the provision that these values can be exceeded or fallen below by 20% or 30%.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-12 of the drawings. Identical elements in the various figures are designated with the same reference numerals.

Figure 1A:
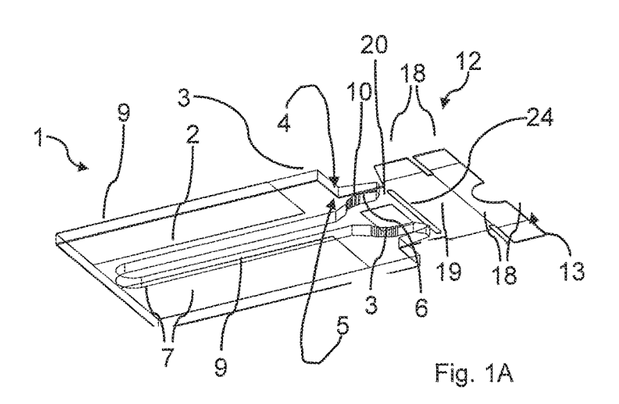
FIG. 1A is a perspective view of an air distribution module of an air-conditioning device for a vehicle seat according to the invention.
Figure 1B:
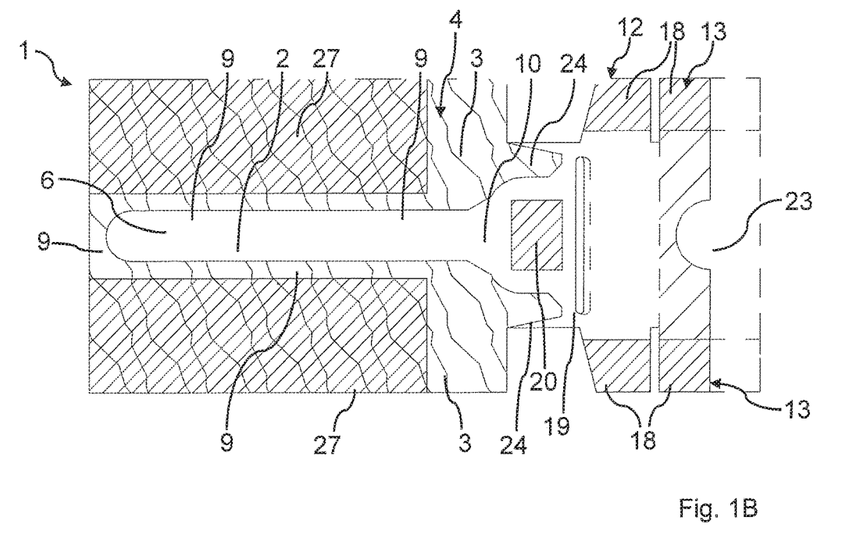
FIG. 1B is a view onto the top side of the air distribution module of FIG. 1A.

The air distribution module for an air-conditioning device of a vehicle seat, which is shown in a perspective view in FIG. 1A and in a top view onto the top side in FIG. 1B, and which is generally designated with the reference sign 1, comprises at least one air distribution chamber 2, which is essentially circumferentially delimited by an insert 3. This insert 3 has a top side 4 and a bottom side 5. The insert 3 has a uniform thickness. On the bottom side 5 of the insert 3, the air distribution chamber 2 is delimited by a carrier layer 6 while the top side 4 of the insert 3 is not covered and consequently the air distribution chamber 2 is open on this side. Especially this design of the air distribution module 1 constitutes an important aspect of the invention since usually such air distribution chambers are stiffened by a spacer material placed therein, which is furthermore surrounded or enveloped on all sides by an air-impermeable material layer.

Figure 5:
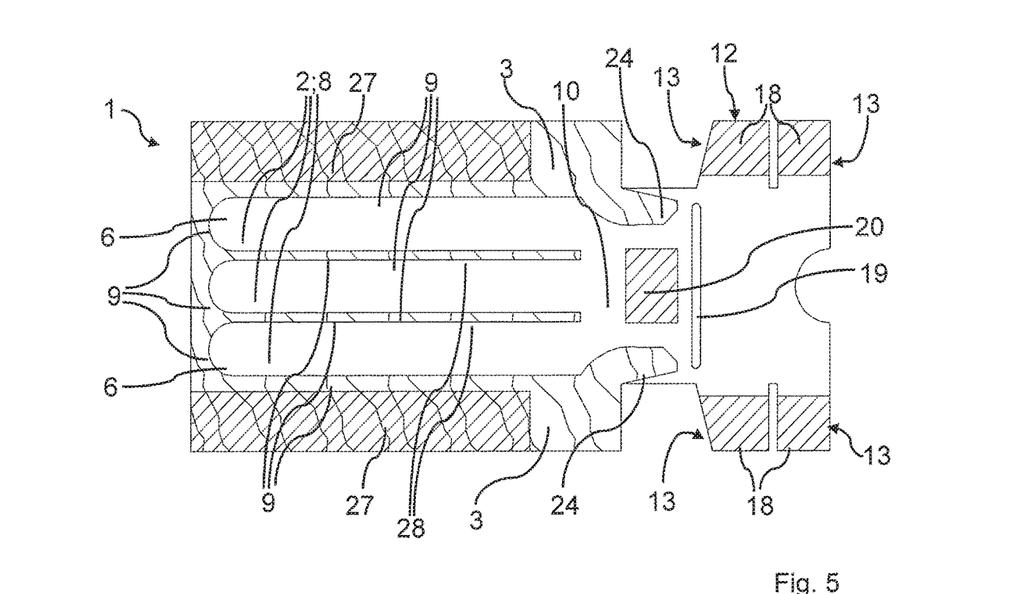
FIG. 5 shows an air distribution module similar to that shown in FIGS. 1A and 1B, wherein the air distribution chamber is divided into three subspaces.

Such an air distribution module 1 is particularly suitable for an arrangement on the B side of a seat cushion or on the B side of a backrest cushion, that is, on the side of the respective cushion facing away from a person sitting on the seat. However, it is not excluded that such an air distribution module 1 is also arranged on the side of the respective seat or backrest cushion facing the seated person. In such a case, the air distribution chamber 2 has only a small width compared to its length, as is shown, for example, in the embodiment of FIG. 1A, or that the air distribution chamber 2 is divided into a plurality of partial air distribution chambers 8, which are narrow compared to the length, as shown in FIG. 5.

The thickness of the insert 3 between its top side 4 and bottom side 5 is from 5 mm to 30 mm, more preferably from 10 mm to 15 mm.

The air distribution chamber 2 is left completely free, which means, no spacer materials are used in the air distribution chamber 2 that could in any way hinder or impair the air flow passing through the air distribution chamber 2. Excluded from this stipulation are those parts that rest flat against the side walls 9 of the insert 3, which delimit the air distribution chamber 2, and/or against the bottom surface, which is formed by the carrier layer 6.

The insert 3 can consist of a foam material, preferably of a closed-pore foam material, so that the insert 3 is essentially air-impermeable, although this is not absolutely necessary, in particular not if this air distribution module 1 is inserted in a recess of a cushion core such that the side edges 7 of the insert 3 are located within such a recess. The insert 3, or parts thereof, could also be formed from a fiber composite material, a moss rubber, from a pressed or compacted felt or felt-like material so that the insert 3 is essentially dimensionally stable and that it can adapt to a curvature present in the seat cushion. This is particularly true in the case where the air distribution module 1 is used in a recess of a cushion whose bottom surface has a slight curvature or concavity.

As can be seen from FIGS. 1A and 1B, the insert 3 has a rectangular outer contour; the shape of the insert 3, in particular its outer dimension, is adapted to the requirements imposed on the air-conditioning of a vehicle seat and can, therefore, also have other geometric external dimensions. In a part of the embodiments of the air distribution module 1 shown in the Figures, the insert 3, which delimits the air distribution chamber 2, is open on one side, so that a break 10 is produced, via which the air from a fan not shown in FIGS. 1A and 1B is supplied to the air distribution chamber 2.

Figure 6:
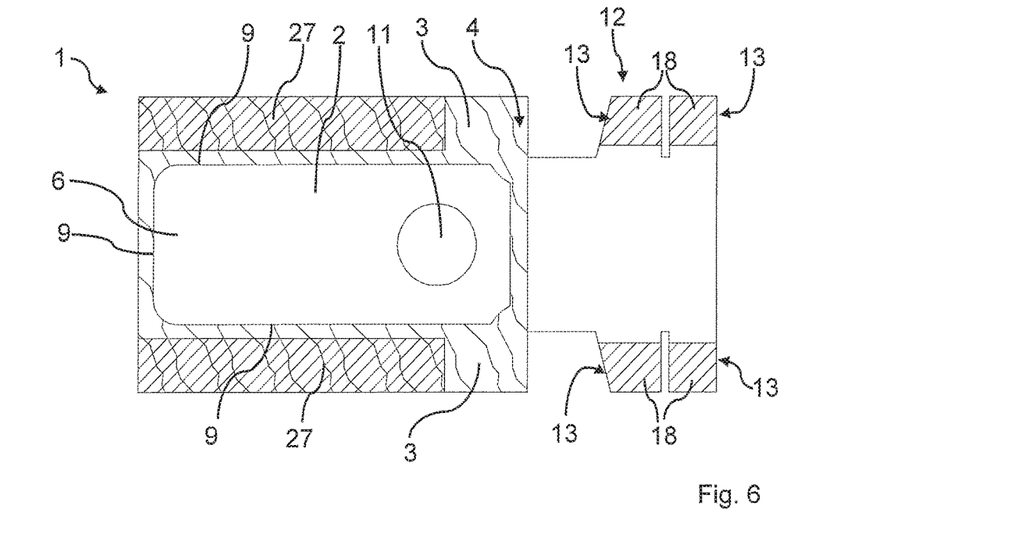
FIG. 6 shows an air distribution module in which an air supply is provided from the bottom side.
Figure 7:
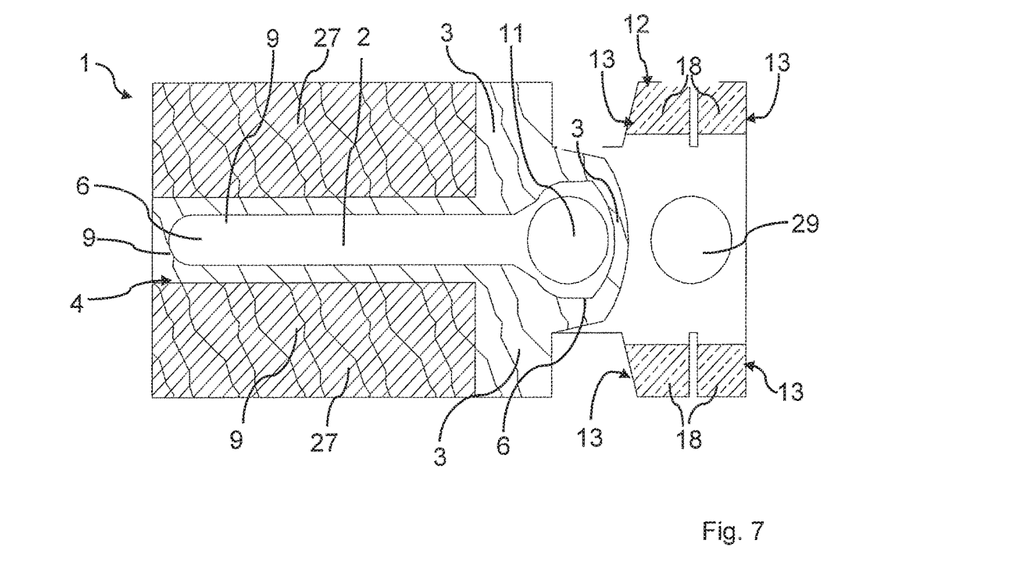
FIG. 7 shows a modification of the air distribution chamber of FIG. 6.
Figure 8:
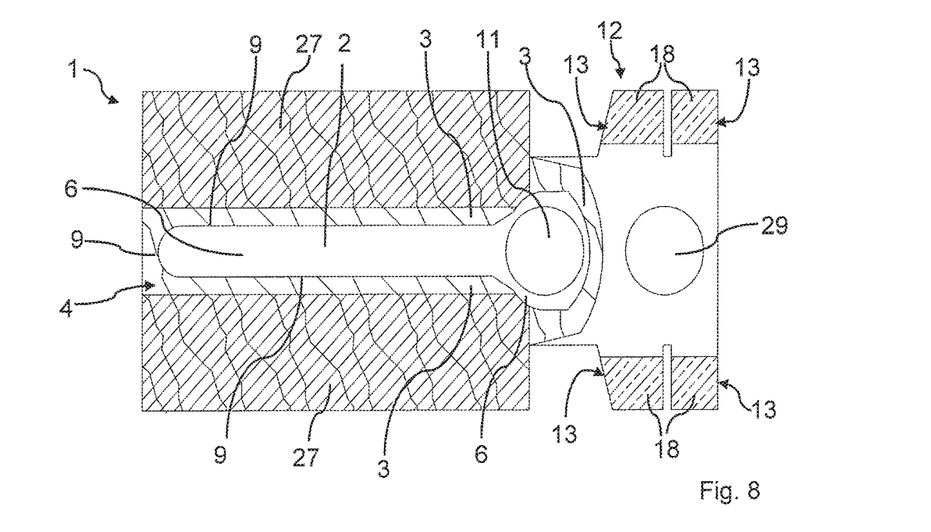
FIG. 8 shows an air distribution module, which essentially corresponds to that shown in FIG. 7.

In other embodiments that are shown in FIGS. 6 to 8, for example, and which are explained in more detail below, an opening 11 is formed in the carrier layer 6, which is arranged at the bottom side 5 of the insert 3 connected on the inner or outer side thereof to an axial air supply opening of a fan for the air supply or removal.

Embodiments of the air distribution module 1 are also provided which have both a break 10 in the region of the insert 3 and an opening 11 in the carrier layer 6 for air supply, wherein both a single fan with a corresponding air distribution unit (Y-shaped) can be used for the break 10 and for the opening 11, as well as two fans can be used.

When the opening 11 is positioned in the carrier layer 6 in the region of the carrier layer 6 that is located below the break 10 in the insert 3, air can flow into the air distribution chamber 2 via the break 10 as well as via the opening 11 in the carrier layer 6 using one single fan.

In the respective embodiments of the air distribution module 1 shown in the Figures, the carrier layer 6 has at least one extension section 12. This extension section 12 can have very different shapes in the various embodiments shown in the Figures in top view, viewed as a precut together with the carrier layer 6. However, the respective extension sections 12 are characterized by the common feature that a fan, a housing of a fan and/or a fan bracket is attached to the air distribution module.

However, it should be pointed out that the extension section 12 can assume additional functions in that surface sections of the extension section 12 can be used for stiffening or partially sealing the air distribution chamber 2 or partial areas of the insert 3. For the function of connecting the fan and/or a housing of a fan and/or the fan bracket to the air distribution module, at least surface parts of the extension section 12 are positioned around the fan and/or a housing of a fan and/or the holder enveloping them in part. At least a part of such surface parts is connected to the top side 4 of the insert 3 or guided such that it can be fastened to the bottom side 5 of the insert 3, and there preferably to the outer side of the carrier layer 6.

In principle, in addition to the extension section 12, no further fastening means are required or provided in order to hold the fan on the air distribution module 1. However, if additional fastening components are used, which are not shown in the Figures, the extension section 12 nevertheless assumes at least 50% or at least 75% of this function, although preferably no further essential fastening parts are used.

The term extension section 12 refers to all the surface parts which are positioned at the carrier layer 6, the carrier layer 6 being the area that is assigned to the part of the insert 3 that surrounds the air distribution chamber 2. Accordingly, the extension section 12 may be divided into a plurality of surface sections, extending in different directions, and designed, for example, in the form of one tab, or several tabs.

Such tabs, designated with the reference sign 13, are formed on opposite sides in the embodiment of FIGS. 1A and 1B, namely on the sides that correspond to the long sides of the outer contour of the rectangular precut of the insert 3.

The extension section 12 is provided on its top and/or bottom side with at least one adhesive layer 18 with which the respective extension section 12 or the respective tab 13 can be connected as part of the extension section 12 to that part of the air distribution module 1 that is associated with the insert 3 in order to attach the fan unit 14 to the air distribution module 1.

Figure 11A:
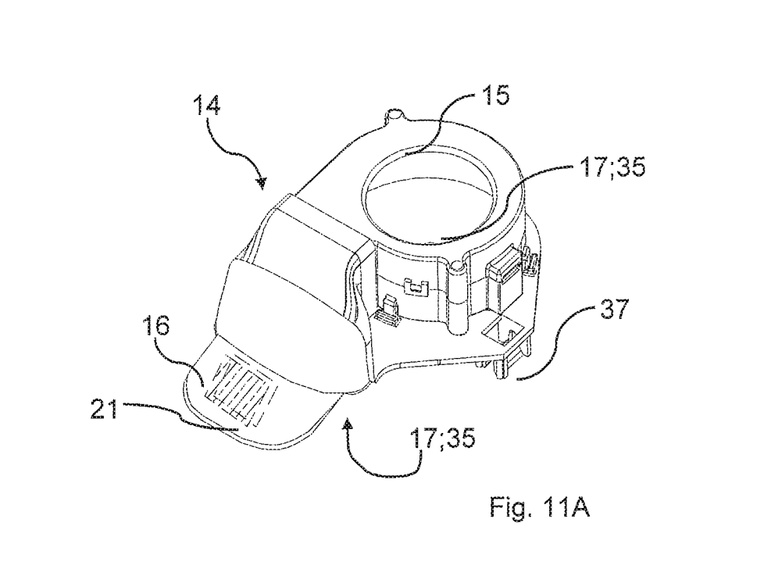
FIGS. 11A and 11B show a ventilation unit with a fan and a special fan housing in a view onto the top side and a view onto the bottom side.
Figure 11B:
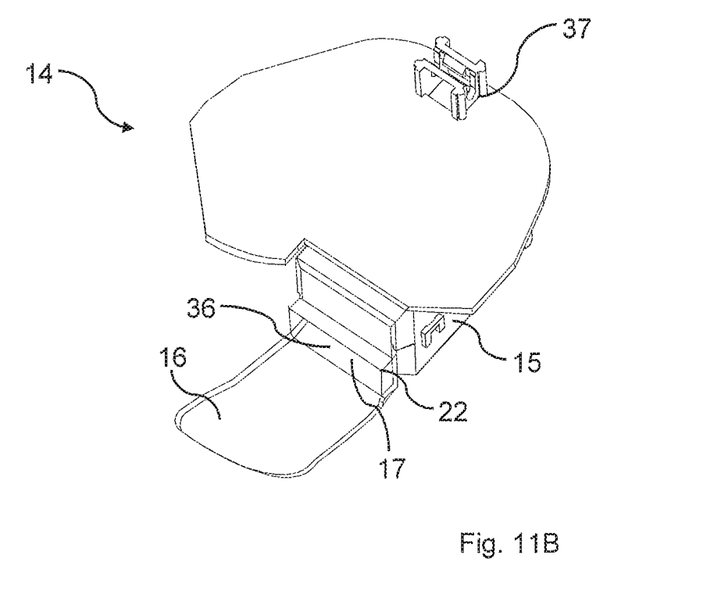

In FIGS. 11A and 11B, a fan or a fan unit 14 is shown as an example, which is particularly suitable for connecting to the air distribution module 1, as shown in FIGS. 1A and 1B. As a special feature, the fan unit 14 in FIGS. 11A and 11B has a substantially dimensionally stable tongue 16 projecting from the housing 15, which is positioned on the part of the housing 15, on which an air outlet opening 17 is located.

The fan unit 14, which is shown in FIGS. 11A and 11B, is preferably a radial fan, which draws the air axially into the fan housing 15 and discharges the air radially via the air outlet opening 17. However, it is also possible to use an axial fan in which the fan housing 15 is reconfigured such that also in the case of such an axial fan a corresponding tongue essentially follows an air outlet opening 17 and rests essentially flat on the inner side of the carrier layer that delimits the air distribution chamber.

In order to connect the fan unit 14 to the air distribution module 1 as shown in FIGS. 1A and 1B, a slot 19 is provided in the carrier layer 6, namely in the transition area to the extension section 12. This slot 19 is consequently arranged in the region in which the break 10 of the insert 3 forming the air supply opening is located. With respect to an imaginary longitudinal axis of the air distribution chamber 2, the slot 19 extends essentially at a right angle thereto.

The fan unit 14 of FIG. 11A or FIG. 11B is inserted from the bottom side into this slot 19 with the dimensionally stable tongue 16 that protrudes from the housing 15, such that this tongue 16 protrudes through the slot 19 upwards in the FIGS. 1A and 1B.

As can be seen from the Figures, the slot 19 and, consequently, correspondingly the dimensionally stable tongue 16, is positioned where the extension section 12 is positioned at the carrier layer 6.

The tongue 16 extends along the inner side of the carrier layer 6 in the direction of the air distribution chamber 2, such that it is inserted in this area between the carrier layer 6 and the bottom side 5 of the insert 3. Between the slot 19 and the break 10 of the insert 3, via which the air is fed into the air distribution chamber 2, there is on the inner side of the carrier layer 6 an adhesive surface 20 by means of which the tongue 16 is glued to the carrier layer 6. The position of this adhesive surface 20 is indicated in FIG. 11A using a double-hatched area 21, which is located on the non-visible bottom side of the tongue 16 in the illustration of FIG. 11B. The adhesive surface 20 could be a double-sided adhesive tape or an elastic adhesive pad. A hook and loop fastener (Velcro closure) is also provided for such a connection. It should be pointed out that the adhesive surface 20 can also be arranged on the bottom side of the tongue 16 instead of an arrangement on the inner side of the carrier layer 6, or also on both parts.

After the tongue 16 is completely inserted from the outside or the bottom side of the extension section 12 into the slot 19, the slot 19 is stretched as indicated by the broken line in FIG. 1B in such a way that it can be pulled over the cross-section of the air outlet opening 17 on the fan housing 15. Preferably, the air outlet opening 17 on the fan housing has around its edge a bead 22 that prevents the fan housing 15 from being released from the slot 19 by the stretched slot 19 being retracted behind the bead 22.

After the fan housing 15 is positioned with the tongue 16 as described above, the extension section 12 is turned over onto the top side 4 of the insert 3, and the respective inner lugs 13 at the opposite sides of the extension section 12 are either glued to the ends of the tabs 13 at the top side of the insert 3 via the adhesive layers 18 or are wrapped around the side surfaces of the insert 3 and glued to the bottom side of the insert 3. For the latter case, the insert 3 has a smaller width at the end that is located in the area of the slot 19. However, these tabs 13 could be designed longer than shown in FIG. 1B so that they can also be guided around the outer sides at full width of the insert 3 and, if necessary, to the bottom side of the insert 3.

Figure 2:
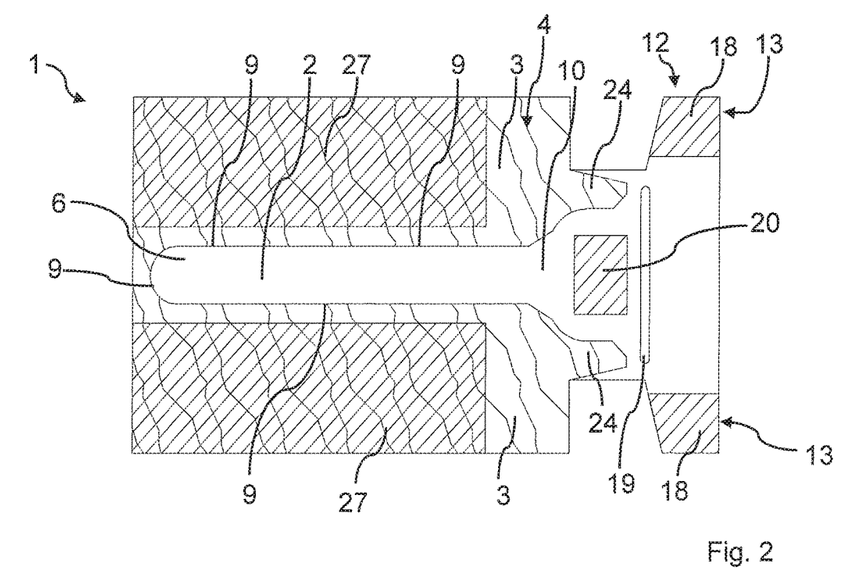
FIG. 2 shows a further embodiment of an air distribution module in the view according to FIG. 1B.

While the extension section 12, as shown in FIGS. 1A and 1B, has two of these tabs 13 on each of its two opposing side edges, the extension section 12 can also be provided with only one single tab 13 on each side in a different embodiment, as shown, for example, in FIG. 2. In contrast to this embodiment of FIG. 2, the double tabs 13 of the extension section 12 have the advantage of a greater flexibility for connecting the extension section 12 at the insert 3 or on parts of the fan and/or the fan housing and/or the fan bracket.

It is also provided that on the respective side of the extension section 12, the one of the two tabs 13 assigned to this side is longer than the other tab 13 so that the longer tab 13 (not shown in FIGS. 1A and 1B) when the extension section 12 rests on the top side of the insert 3, is guided around the outer edges of the insert 3 to the bottom side thereof and there onto the outer surface of the carrier layer 6 in order to glue the tab 13 with its adhesive layer or adhesive surface 18 to the outer side of the carrier layer 6.

In a further embodiment, the part of the extension section 12 that forms the free end of the extension section 12 that is indicated by the dashed line and is designated by the reference sign 23, when the part of the extension section 12 that is adjacent to the slot 19 rests on the top side 4 of the insert 3, are folded back onto themselves, in order to then fasten the tabs 13 thereof to the fan housing 15. It is understandable that in this case the corresponding adhesive layer 18 is applied on the bottom side of the tabs 13, starting from the illustration of FIG. 1B. In this case, the tabs 13 can also be made longer than shown in FIG. 18 in order to guide the tabs 13 around the fan housing 15, for example.

It should be mentioned that the air distribution chamber 2 in the insert 3 can be widened in width, in particular flared, in the region in which the insert 3 has the break 10 for the supply of air, in that the insert 3 has extension parts in the manner of appendages 24 in order to channel the air of a fan entering the air distribution module 1 in the region of the slot 19 onto the cross-section of the air distribution chamber 2.

While the air distribution chamber 2 widens in the form of a funnel at its open end through the extensions 24, the open end of the air distribution chamber 2 can also narrow in a funnel-shaped manner towards the slot 19, as shown, for example, in the embodiment of FIG. 5, namely when the air distribution chamber 2 has a width that is greater than the range available to supply air at the open end 10 of the air distribution chamber 2.

It shall be pointed out expressly that in the following description of the various exemplary embodiments, as shown in FIGS. 1 to 11B, not all components are described again for an embodiment if they have already been described or explained with reference to another embodiment. Accordingly, the description of the various components of one embodiment may be applied to the respective components of another embodiment without explicitly mentioning this.

It should also be pointed out that flow directions, as far as they are mentioned, can also be reversed, so that, for example, a fan or a fan unit that supplies air into the air distribution chamber could also draw air from the air distribution chamber.

FIG. 2 shows a further embodiment of an air distribution module in a view corresponding to FIG. 1B. In contrast to FIG. 1B, the extension section 12 has only one individual tab 13 on its two opposite sides. The fan unit 14 is attached to this air distribution module 1 in the same manner as described above with reference to FIG. 1B.

In the embodiments of FIGS. 1 and 2, the tabs 13 are positioned with respect to the slot 19 in such a way that they are located on the side of the slot 19, which is located on the side opposite the air distribution chamber 2 in top view onto the carrier layer 6 and the adjoining extension section 12, as seen in the precut.

It may also be useful to use a fan unit where the air outlet opening is positioned directly at the break 10 of the insert 3, and the extension section 12, and, if appropriate, the tap sections 13 thereof, is placed around the fan or its fan housing or a fan bracket in order to connect the corresponding unit that feeds air into the air distribution chamber 2 to the air distribution module 1. In such a case, the slot 19 is not required in the transition area between the carrier layer 6 and the extension section 12.

Figure 3:
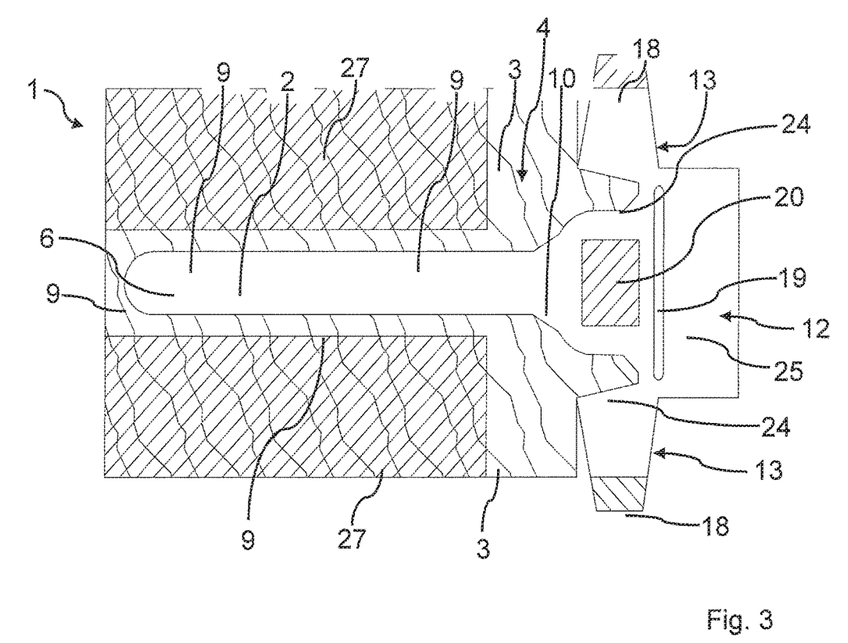
FIG. 3 shows the air distribution module in a modified form.

FIG. 3 shows a modified form of the air distribution module 1 shown in FIG. 2. In contrast to the design of FIG. 2, the tabs 13 are arranged on the two opposite sides of the extension section 12 with respect to the position of the slot 19 on the side that is associated with the air distribution chamber 10. On the opposite side of the slot 19 is a surface part 25 which has no tabs on the sides. In order to fasten the fan 14, 15 in this embodiment of the air distribution module 1, the tongue 16 thereof is in turn pushed through the slot 19, then the surface part 25 is placed on the top side 4 of the insert 3 or on the top side of the extensions 24 of the insert 3, if appropriate also glued to it, in order subsequently to bond the two tabs 13 by means of their adhesive surfaces 18 to the top side of the surface part 25. If appropriate, the tabs 13 can first be placed on the top side 4 of the insert 3, and then the surface part 25 is folded onto the outer side of the tabs 13 and, if appropriate, glued thereto.

Figure 4:
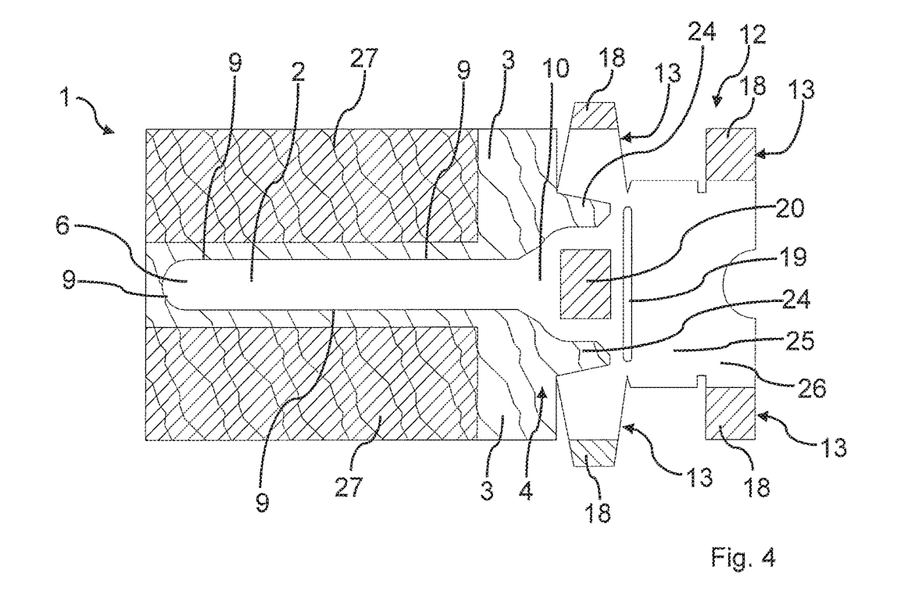
FIG. 4 shows an air distribution module according to FIG. 3 in a further, modified embodiment.

The air distribution module 1, as shown in FIG. 4, is based on the air distribution module 1 of FIG. 3 described above. In FIG. 4, an end section 26, which has a tab 13 with adhesive surfaces 18 on its two opposite sides, is positioned at the end of the surface part 25. When the surface part 25 with the end section 26 is turned over onto the top side 4 of the insert 3, the additional tabs 13 on the end section 26 serve to additionally fasten the extension section 12 with the adhesive layers 18 to the top side 4 of the insert 3.

In the various embodiments shown in the Figures, adhesive areas 27 are provided on the top side 4 of the insert 3, which in certain applications serve the purpose of attaching the air distribution module 1 to a surface of the seat, preferably to the cushion part of the seat and there in a corresponding recess of the seat. These adhesive areas 27 cover the predominant part of the surface 4 of the insert 3. They can consist of a double-sided adhesive tape, an adhesive layer applied to the surface 4 of the insert 3, which is preferably sprayed on, and which are preferably self-adhesive.

FIG. 5 shows an air distribution module, which is comparable to that illustrated in FIGS. 1A and 1B. In contrast to the embodiment of FIGS. 1A and 1B, the air distribution chamber 2 is subdivided into three sub-chambers 8, each of which is designated by the reference sign 8. These three sub-chambers are separated from one another by narrow webs 28, which are part of the insert 3, but are fluidically connected at their one end that is fed into the air distribution chamber 2 in the region of the break 10 of the insert 3. Since the width of the three sub-chambers of the air distribution chamber 2 is substantially greater than the associated and required air supply opening, the extensions 24 are oriented as part of the insert 3 in such a way that they narrow the cross-section of the air distribution chamber 2 in the form of a funnel, while in the embodiment described above, the air distribution chamber 2 expands in a funnel shape.

The embodiments of the air distribution module 1, which are illustrated in FIGS. 6 to 8, differ from the previously described embodiments in that the air supply to the air distribution chamber 2 extends via an opening 11 in the carrier layer 6 and thus from the bottom side 5 of the insert 3.

The opening 11 in the carrier layer 6 can be arranged in a suitable region with respect to the air distribution chamber 2. However, it is preferred that the opening 11 is arranged on that side of the air distribution chamber 2, where the extension section 12 of the carrier layer 6 follows.

For air supply, a fan is positioned at the bottom side of the air distribution module 1 such that its housing protrudes into the air distribution chamber 2 at least in the region of the radial outlet opening, while the part of the housing via which the air is drawn in is positioned on the bottom side of the carrier layer. The extension section 12 is folded over to the top side 4 of the insert 3 and attached there on the top side 4 so that the fan is covered, although this is not absolutely necessary. In addition, the extension portion 12 may have adhesive surfaces (not shown) that connect to the top side 4 of the fan housing, which protrudes into the air distribution chamber 2 so that the extension section 12 can be folded/placed back onto itself.

FIG. 7, which corresponds to FIG. 5 with respect to the design of the extension section 12 with the tabs 13, is modified in that the air is fed into the air distribution chamber 2 via a fan, the housing of which is at least partly accommodated in the opening 11, as previously described with reference to FIG. 6. However, another opening 29 is formed in the extension section 12 corresponding to the opening 11 when the extension section 12 is folded over onto the top side 4 of the insert 3. This embodiment is suitable for a fan that is inserted into the opening 11 such that it discharges air radially into the air distribution chamber 2, but draws this air axially from the direction of the top side 4 of the insert 3. The opening 29 of the extension section 12 does not have to be adapted exactly to the opening 11 in the carrier layer 6. The size of the opening 29 depends on the size of the suction area in the housing of the fan unit.

The air distribution module 1 presented in FIG. 8 corresponds in its essential design to that presented in FIG. 7. The embodiment of FIG. 8 shows that the sizes of the adhesive regions 27 on the top side 4 of the insert 3 can vary. Such an adhesive surface 27 on the top side 4 of the insert 3, as a comparison of FIG. 7 with FIG. 8 shows, can be omitted where the adhesive layers 18 are present on the tabs 13 that are connected to the top side 4 of the insert 3.

Figure 9:
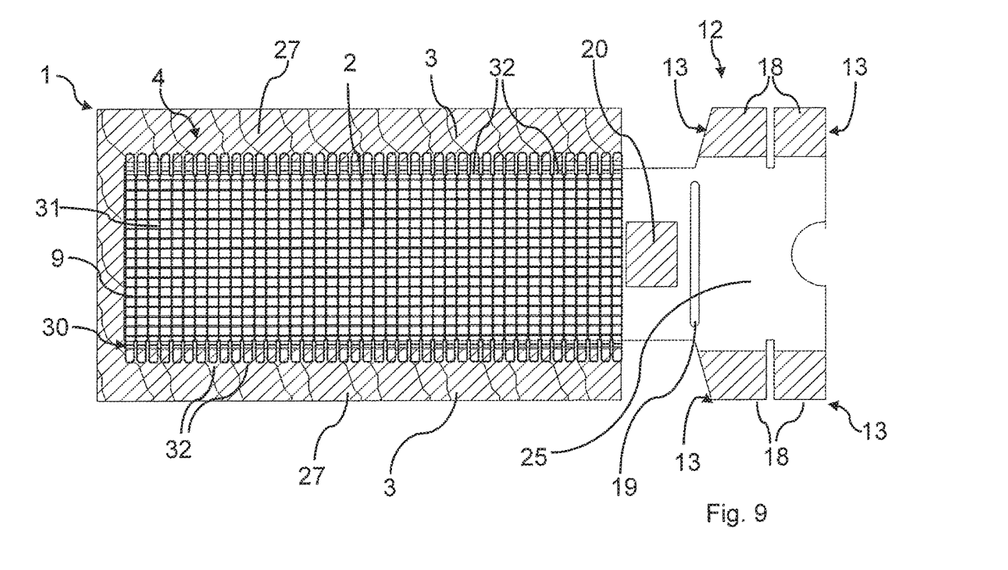
FIG. 9 shows a further air distribution module having an additional reinforcing element placed into the air distribution chamber.

FIG. 9 shows a further air distribution module 1 in which an additional reinforcing element 30 is inserted into the air distribution chamber 2. This reinforcing element 30 is shown in a perspective view also in FIG. 10.

Figure 10:
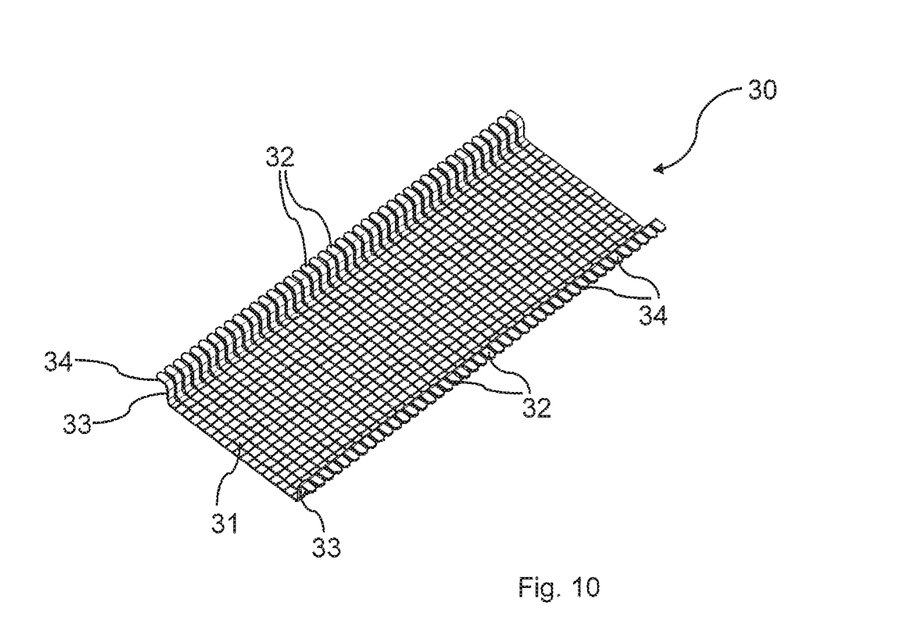
FIG. 10 shows the reinforcing element of FIG. 9 in a perspective view.

Such a reinforcing element 30 has a base plate 31 with retaining parts 32 that are positioned on two opposite sides of the base plate 31. These retaining parts 32 have two leg sections, wherein the first leg section 33 extends perpendicularly upwards with respect to the plane of the base plate 31, while the other, second leg section 34 extends vertically or perpendicularly to the first leg section 33 at the end of the first leg section 33 toward the outside. The base plate 31 of the reinforcing element 30 is presented having a texture. However, such a texture is not required essentially serves only for a better presentation. A smooth and flat plate is preferred.

The retaining parts 32 are considered a special feature, in particular, the shape thereof. It shall be noted that the retaining parts 32, as they are positioned at the edges of the base plate 31 of the reinforcing element 30, are separated from one another, as can be seen more clearly in FIG. 9. These retaining parts 32 with an L-shape of the two leg sections 33 and 34 are thus decoupled from each other so that they can adapt to the respective circumstances. However, the leg sections 33 and 34 can also be formed from contiguous surface parts.

This reinforcing element 30 serves to reinforce the interior, i.e., the air distribution chamber 2 of the insert 3. For this purpose, the base plate 31 is inserted into the air distribution chamber 2 such that it rests flat on the inner side of the carrier layer 6, which delimits the air distribution chamber 2 at its bottom side. A stable base surface is thus obtained in the air distribution chamber 2, so that the air distribution chamber 2 is not compressed or does not collapse when external forces act upon same, for example via the seat cushion. On the other hand, this reinforcing element 30 does not substantially affect the cross section of the air distribution chamber, especially since the base plate 31 of the reinforcing element 30 can be made very thin, preferably in a thickness of 0.5 mm to 2 mm, more preferably 0.5 mm to 1.5 mm, and even more preferably in the range of about 1 mm.

If the reinforcing element 30 is provided at least on the two opposite sides, but also when the two other sides are provided with the retaining parts 32, the base plate 31 is additionally supported on the edge of the insert 3 that delimits the air distribution chamber 2, in that the first holding sections 33 extending vertically are supported on the inner side walls of the insert 3, and the other, second leg sections 34 rest on or are supported by the top side 4 of the insert 3 in the edge region thereof.

While the retaining parts 32 in FIGS. 9 and 10 are integrally connected to the base plate 31 of the reinforcing element 30, they can also be attached to the base plate 31 as separate parts.

The retaining parts 32, when divided in the form of tongue-like parts, as presented in the Figures, should be aligned essentially continuously and movable independently of one another. The width of the tongue-like retaining parts 32 should be in the range of 3 mm to 10 mm, preferably in the range of about 5 mm, and adjacent retaining parts 32 should be separated from each other by a slot not wider than a maximum of 1 mm, although the slot can have a width of 0.5 mm to 2 mm. It is also provided that, in one embodiment of the reinforcing element 30, as illustrated in FIGS. 9 and 10, every second retaining part 32 is omitted, so that adjacent retaining parts 32 are spaced approximately 5 mm to 10 mm apart from each other, taking into account the above-indicated magnitude of the retaining parts 32.

Figure 12:
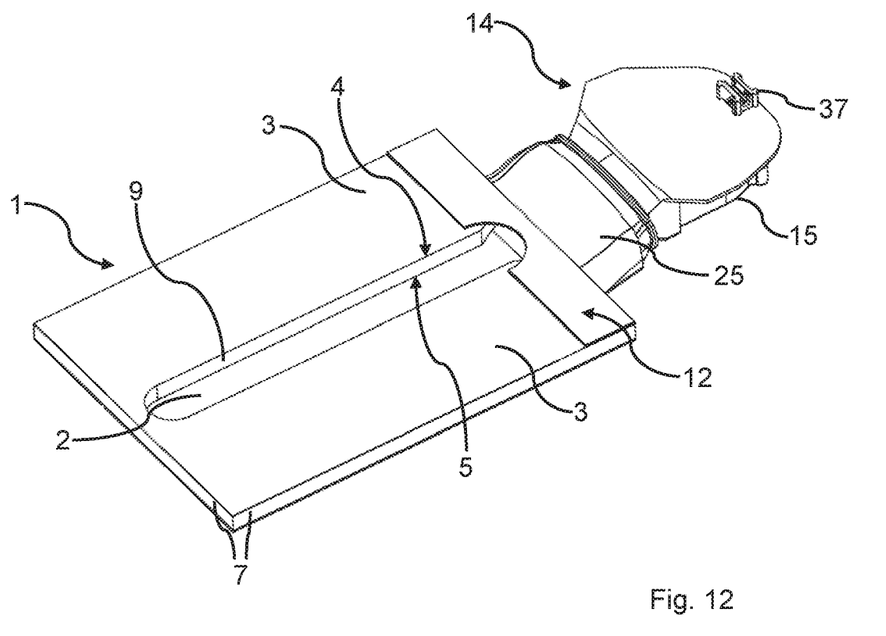
FIG. 12 shows an air distribution module in accordance with various embodiments.

The reinforcing element 30 may be provided at the end, where the air supply opening for the supply of air of a fan unit is located, i.e., in the region in which the insert 3 is also interrupted, designed as a tubular channel for receiving the fan or the fan housing or the fan bracket. In this way, a stable base for the fan 14 is obtained, corresponding to the tongue 16 of the fan unit that is illustrated in FIGS. 11 and 12 and has already been described above.

If a fan 14 is intended to supply air into the air distribution chamber 2 via an opening 11 in the carrier layer 6, as shown and described above with reference to FIGS. 6 to 8, the base plate 31 of the reinforcing element 30 can be provided with an opening corresponding to the opening 11 in the carrier layer 6.

As already mentioned, the reinforcing element 30 is formed from a rigid material with a defined bending elasticity. The bending elasticity is intended to ensure that the contour dimensions of the air distribution space 2 are not substantially altered under the action of forces, but a slight curvature of the base plate 31 is possible so that the air distribution module 1 can adapt to a slight deformation of a seat cushion into which the air distribution module is inserted or on which it rests, so that it is in no way felt by a user of the seat.

A plastic with at least partially elastic properties should be used as the material for the reinforcing element 30. The material thickness of the reinforcing element 30 is in the range from 0.3 mm to 10 mm, preferably in the range from 0.5 mm to 5 mm, particularly preferably in the range from 1 mm to 3 mm or 1 mm to 1.5 mm. In any event, the thickness of the stiffening member 30 should be kept small.

The fan unit 14, as shown in FIGS. 11 and 12, essentially serves to explain the dimensionally stable tongue 16, which in the various embodiments serves to pass through the slot 19 in the carrier layer 6 and which rests on the inner side of the carrier layer 6.

This fan unit 14 is a fan that draws air axially via a fan opening 35 and discharges this air radially via a further fan opening 36 in the region of the dimensionally stable tongue 16. The fan housing has, on one side, a clamping or fastening part 37 by means of which it can be attached to a seat structure, for example. Preferably, the fan housing is at least partially inserted into a cushion core on the B side of a seat cushion.

There has thus been shown and described a novel air conditioning device for a vehicle seat which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Air-conditioning device for a vehicle seat, comprising at least one air distribution module, which has at least one air distribution chamber, wherein the air distribution chamber is delimited at least on a part of its outer circumference by an insert that has a top side and a bottom side, wherein the air distribution chamber is delimited on the side that is associated with the bottom side of the insert by a carrier layer that is at least over a partial surface connected to the bottom side of the insert; wherein an air supply opening for supplying air into the air distribution chamber is established at least in part via a break in the insert or via an opening in the carrier layer; wherein the air distribution chamber is open on the top side opposite the carrier layer, and wherein a reinforcing element is inserted into the air distribution chamber and has a base plate that rests on the carrier layer at least over a partial surface, and wherein the reinforcing element has, on two opposite sides, retaining parts which rest or are supported on two opposite sides of the insert that delimit the air distribution chamber, and wherein the retaining parts are each subdivided into a plurality of holding elements in the form of tongue-like parts that are successively aligned next to each other and can be moved independently of one another.

2. Air conditioning device as in claim 1, wherein the respective retaining parts are supported on the opposite sides of the insert and rest on the top side of the insert.

3. Air conditioning device as in claim 1, wherein the retaining parts are integrally connected to the base plate of the reinforcing element.

4. Air conditioning device as in claim 1, wherein the reinforcing element is formed from a rigid material with a defined bending elasticity so that the dimensions of the air distribution chamber are not substantially changed under the action of forces, while however allowing for a small curvature of the base plate.

* * * * *